United States Patent
Schinzler et al.

(10) Patent No.: US 11,748,105 B2
(45) Date of Patent: Sep. 5, 2023

(54) METHODS AND APPARATUS FOR STORING A COPY OF A CURRENT FETCHED INSTRUCTION WHEN A MISS THRESHOLD IS EXCEEDED UNTIL A REFILL THRESHOLD IS REACHED

(71) Applicant: Arm Limited, Cambridgeshire (GB)

(72) Inventors: Michael Brian Schinzler, Round Rock, TX (US); Muhammad Umar Farooq, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 148 days.

(21) Appl. No.: 17/241,365

(22) Filed: Apr. 27, 2021

(65) Prior Publication Data

US 2022/0342671 A1  Oct. 27, 2022

(51) Int. Cl.
*G06F 9/38* (2018.01)
*G06F 9/30* (2018.01)
*G06F 9/32* (2018.01)

(52) U.S. Cl.
CPC ........ *G06F 9/3802* (2013.01); *G06F 9/30043* (2013.01); *G06F 9/321* (2013.01); *G06F 9/3861* (2013.01)

(58) Field of Classification Search
CPC .............................. G06F 9/3802; G06F 9/3861
See application file for complete search history.

(56) References Cited

U.S. PATENT DOCUMENTS

| | | | | |
|---|---|---|---|---|
| 10,489,305 B1* | 11/2019 | Heremagalur Ramaprasad | ......... G06F 12/0897 |
| 2003/0196044 A1* | 10/2003 | Ramirez | ............... G06F 9/3802 | 712/E9.055 |
| 2008/0235453 A1* | 9/2008 | Emma | ................... G06F 12/127 | 711/122 |
| 2010/0241832 A1* | 9/2010 | Craske | .................... G06F 9/324 | 712/205 |
| 2017/0364363 A1* | 12/2017 | Darbari | ................. G06F 9/3861 |

* cited by examiner

*Primary Examiner* — Michael J Metzger
(74) *Attorney, Agent, or Firm* — NIXON & VANDERHYE P.C.

(57) ABSTRACT

Aspects of the present disclosure relate an apparatus comprising fetch circuitry and instruction storage circuitry. The fetch circuitry is to fetch instructions for execution by execution circuitry. The instruction storage circuitry is to store temporary copies of fetched instructions. The fetch circuitry is configured to preferentially fetch instructions from the instruction storage circuitry. The instruction storage circuitry is configured to, responsive to a storage condition being met, begin storing copies of consecutive fetched instructions, the storage condition indicating a utility of a current fetched instruction; and to, responsive to determining that a number of said stored consecutive instructions has reached a storage threshold, cease storing copies of subsequent fetched instructions.

18 Claims, 7 Drawing Sheets

METHODS AND APPARATUS FOR STORING A COPY OF A CURRENT FETCHED INSTRUCTION WHEN A MISS THRESHOLD IS EXCEEDED UNTIL A REFILL THRESHOLD IS REACHED

BACKGROUND

The present technique relates to the field of instruction storage, in particular temporary instruction storage for example in an instruction cache.

Circuitry such as a cache can be used to store temporary copies of instructions in anticipation of the instructions being executed by processing circuitry. For example, the time to access an instruction from a temporary storage (e.g. a cache) may be less than the time to access an instruction from a larger storage, thereby facilitating more efficient execution of instructions. However, if such a temporary storage is inefficiently filled (for example, if the temporary storage is filled with instructions which are unlikely to be executed), the advantages of the temporary storage are reduced or eliminated.

There is thus a desire for improved methods and apparatus for temporarily storing copies of instructions, in which the expected usefulness of the temporarily stored instructions is improved).

SUMMARY

At least some examples provide an apparatus comprising:
fetch circuitry to fetch instructions for execution by execution circuitry; and
instruction storage circuitry to store temporary copies of fetched instructions, wherein the fetch circuitry is configured to preferentially fetch instructions from the instruction storage circuitry, wherein the instruction storage circuitry is configured to:
responsive to a storage condition being met, begin storing copies of consecutive fetched instructions, the storage condition indicating a utility of a current fetched instruction;
responsive to determining that a number of said stored consecutive instructions has reached a storage threshold, cease storing copies of subsequent fetched instructions.

Further examples provide a method comprising:
fetching instructions for execution by execution circuitry;
responsive to a storage condition being met, beginning storing copies of consecutive fetched instructions, wherein:
the storage condition indicates a utility of a current fetched instruction; and
said fetching comprises preferentially fetching instructions from the instruction storage, and
responsive to determining that a number of said stored consecutive instructions has reached a storage threshold, ceasing storing copies of subsequent fetched instructions.

Further examples provide an apparatus comprising:
fetch means to fetch instructions for execution by execution circuitry; and
instruction storage means to store temporary copies of fetched instructions, wherein the fetch means is configured to preferentially fetch instructions from the instruction storage means, wherein the instruction storage means is configured to:
responsive to a storage condition being met, begin storing copies of consecutive fetched instructions, the storage condition indicating a utility of a current fetched instruction;
responsive to determining that a number of said stored consecutive instructions has reached a storage threshold, cease storing copies of subsequent fetched instructions.

Further aspects, features and advantages of the present technique will be apparent from the following description of examples, which is to be read in conjunction with the accompanying drawings.

DESCRIPTION OF EXAMPLES

Figure 1:
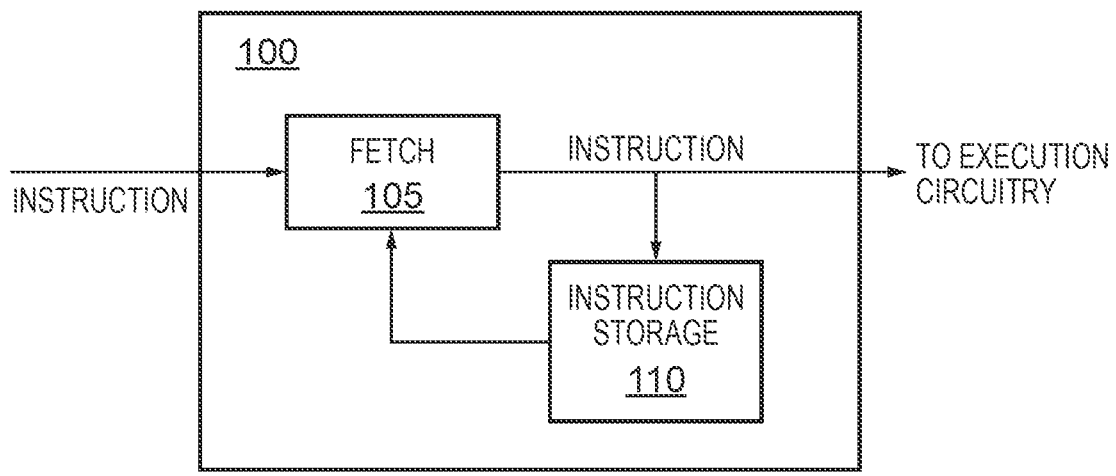
FIG. 1 schematically depicts an apparatus according to an example.

As indicated above, in one example an apparatus comprises fetch circuitry, and instruction storage circuitry (which may for example be an instruction cache) to store temporary copies of fetched instructions.

The fetch circuitry is configured to fetch instructions for execution by execution circuitry. This fetching may be a speculative fetching of instructions which are predicted to be required for execution by the execution circuitry. Such speculative fetching improves efficiency of operation by allowing instructions to be fetched before it is known that they will be executed.

The fetch circuitry preferentially fetches instructions from the instruction storage circuitry. Thus, if an instruction to be fetched is stored in the instruction storage circuitry, the fetch circuitry fetches it from the instruction storage circuitry. Otherwise, the fetch circuitry fetches it from elsewhere, for example from other storage such as a memory.

Responsive to a storage condition being met, the instruction storage circuitry begins storing copies of consecutive fetched instructions. The storage condition indicates a utility of a current fetched instruction. For example, the storage condition may be indicative of an expected temporal and/or spatial locality of the current instruction, i.e. that it is expected that instructions which are executed shortly after the current instruction, and/or instructions which neighbour the current instruction, will be repeatedly required for execution. In some examples, for example in which the instruction storage circuitry is a cache, storing instructions may be referred to as "filling" the cache. In some examples, for example in which the instruction storage circuitry is a cache, storing instructions may be referred to as "filling" the cache.

Then, responsive to determining that a number of said stored consecutive instructions has reached a storage threshold, the instruction storage circuitry ceases storing copies of subsequent fetched instructions.

Thus, once an instruction satisfying the storage condition (i.e. an instruction likely to be useful) is stored (e.g. cached), the instruction storage circuitry stores a number of subsequent instructions and then ceases storing. This is based on the assumption that instructions following a useful instruction are also likely to be useful (for example because a block of consecutive instructions is likely to subsequently re-fetched). This increases the expected utility of the stored instructions. Furthermore, capping the storing at the storage threshold means that even if the re-use distance is large relative to the capacity of the storage (i.e. the instructions will be re-used, but only after a relatively large number of other instructions have been fetched), the stored instructions will not be removed to make way for subsequent instructions before they are re-fetched. This also increases the likelihood of a given fetched instruction being stored in the instruction storage circuitry, thereby improving system performance.

The apparatus may further comprise decode circuitry to decode instructions fetched by the fetch circuitry. In this example the temporary copies of fetched instructions, stored by the fetch circuitry, are temporary copies of decoded fetched instructions. For example, the instruction storage circuitry may be a macro-operation storage circuitry, such as a macro-operation cache. This allows for particularly efficient operation, in which decoded instructions can be combined into macro-operations and cached in case they are fetched again; if an address of a fetched instruction hits in the macro-operation cache, it can then be efficiently fetched directly from the macro-operation cache. In other examples, the storage may be associated with a L0 branch target buffer (BTB) such as a nano BTB, micro BTB or small way-predictor.

In some examples, the storage condition is one of a plurality of potential storage conditions. Each such storage condition may have its own associated storage threshold, such that the instruction storage circuitry is configured to apply the storage threshold associated with the met storage condition. This allows the storage threshold to be varied based on the particular storage condition that applies in a given case, to improve or optimise the overall utility of the stored instructions (i.e. to increase the average likelihood that a stored instruction will be fetched again).

In one such example, a first storage condition of the plurality is that a preceding fetched instruction was associated with a mispredicted program branch. In some systems that speculatively fetch instructions before it is known that they will be executed, following identification of a misprediction, the fetching is re-directed to a correct instruction. It can thus be assumed that the instruction following a mispredict is a correct instruction, i.e. a useful instruction that is relatively likely to be fetched again. In this example, this first storage condition is associated with a first storage threshold.

Alternatively or additionally, a second condition of the plurality is that a preceding fetched instruction was fetched from the instruction storage circuitry, and that a copy of the current fetched instruction is not stored in the instruction storage circuitry. This second storage condition is associated with a second storage threshold. In other words, after at least one fetched instruction hits in the instruction storage circuitry, the instruction storage circuitry caches instructions (which miss in the instruction storage circuitry) until the second threshold is reached, on the assumption that the subsequent instructions are also likely to be useful.

The first storage threshold may be greater than the second storage threshold, for example on the assumption that instructions stored based on the first storage condition are more likely to be useful than instructions stored based on the second storage condition. This improves the overall utility of instructions stored in the instruction storage circuitry. For example, the first storage threshold may be three instructions whilst the second storage threshold is two instructions.

In examples, the instruction storage circuitry is configured to, responsive to a number of consecutive fetched instructions not being fetched from the instruction storage circuitry exceeding a miss threshold, store a copy of the current fetched instruction in the instruction storage circuitry. This miss threshold may be larger than the storage threshold, for example at least 100 times larger. The miss threshold may be 1000 instructions. In this manner, if a relatively large number of fetched instructions miss in the instruction storage circuitry (i.e. do not have copies stored in the instruction storage circuitry), it can be assumed that the instruction storage circuitry is filled with relatively useless (low-utility) instructions. Following this assumption, the instruction storage circuitry can start filling again, to replace some of the aforementioned low-utility instructions with newly fetched instructions. This allows an effective correction in the relatively rare event that the instruction storage circuitry becomes filled with low-utility instructions: it will not remain full of such instructions, but will instead replace them.

In one such example, the instruction storage circuitry is responsive to the number of consecutive instructions not being fetched from the instruction storage circuitry reaching the miss threshold, to continue storing copies of current fetched instructions until a number of consecutive stored fetched instructions reaches a refill threshold. The instruction storage circuitry is then responsive to the number of consecutive stored fetched instructions reaching the refill threshold to cease storing copies of current fetched instructions. In other words, after the miss threshold is reached, newly-fetched instructions are filled into the instruction storage circuitry until the refill threshold is reached. This allows the aforementioned correction to effectively be performed, by re-filling a given portion of the instruction storage circuitry. The refill threshold may be at least 100 times larger than the storage threshold, for example 4000 instructions. This provides an effective degree of correction. In one example, the refill threshold may be equal to a capacity of the instruction storage circuitry (for example 1500), such that the entire contents of the instruction storage circuitry can be replaced after the miss threshold is hit. This allows assurance than low-utility instructions are removed, to make space for new instructions that are expected to have higher utility.

Examples of the present disclosure will now be described with reference to the drawings.

FIG. 1 schematically shows an apparatus 100 according to an example of the present disclosure. The apparatus 100 may form part of a larger processing apparatus, such as a central processing unit or graphics processing unit. The circuitry elements may be implemented in dedicated circuitry, or one or more such elements may be conceptual units implemented by general-purpose circuitry.

The apparatus 100 comprises fetch circuitry 105 to fetch instructions. The instructions may be fetched from a main storage. The fetched instructions are passed on to execution circuitry for execution.

The apparatus further comprises instruction storage circuitry 110. The instruction storage circuitry 110 is configured to store temporary copies of fetched instructions, and the fetch circuitry 105 is configured to preferentially fetch instructions from the instruction storage circuitry 110. It is faster for the fetch circuitry 105 to fetch instructions from the instruction storage 110 than from elsewhere, for example the aforementioned main storage, and so overall efficiency can be improved by temporarily storing copies of fetched instructions which are likely to be fetched again. The instruction storage circuitry 110 can thus function as an instruction cache.

The instruction storage circuitry 110 is configured to start storing temporary copies of successive fetched instructions in response to a storage condition, and to subsequently cease storing copies of instructions when a given number of such instructions, equal to a storage threshold, has been reached. Examples of storage conditions and storage thresholds are described in more detail below.

Figure 2:
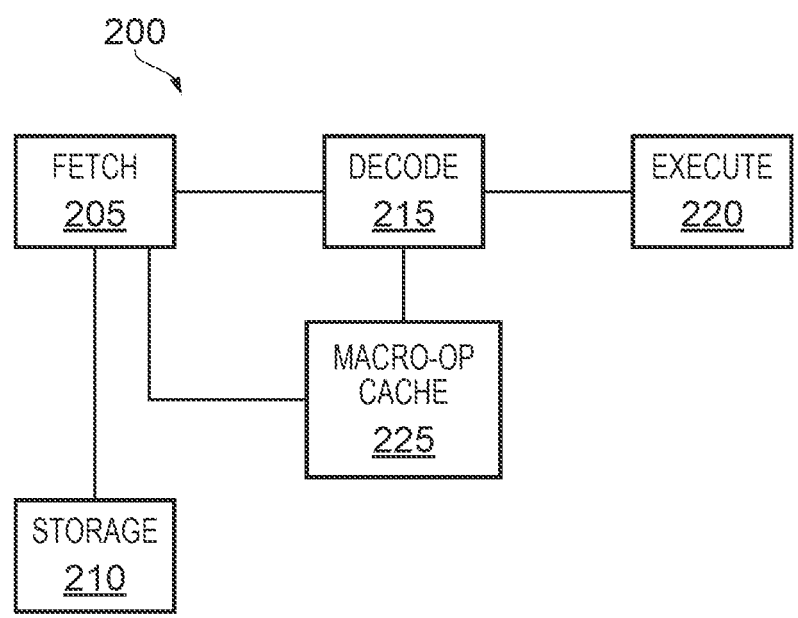
FIG. 2 schematically depicts an apparatus according to an example.

FIG. 2 schematically shows an apparatus 200 according to an example of the present disclosure. As for FIG. 1, the apparatus 200 may form part of a larger processing apparatus. For example, elements of the apparatus 200 may be components of a processing pipeline. As for FIG. 1, the elements of the apparatus 200 may be implemented in dedicated circuitry, or one or more such elements may be conceptual units implemented by general-purpose circuitry.

The apparatus comprises a fetch unit 205 which fetches instructions from a storage 210. The storage 210 may for example be a main storage, such as a memory, or a cache associated such a memory.

The fetch unit 205 passes the fetched instructions to a decode unit 215 which decodes received instructions into a form that is executable by an execution unit 220. For example, a given instruction may be decoded into one or more micro-operations. The decoded instructions are then passed to the execution circuitry 220 for execution.

The apparatus 200 further comprises a macro-operation cache 225. Combinations of one or more micro-operations, e.g. which are to be executed together, can be combined into a macro-operation and stored in the macro-operation cache 225, from which they can be fetched by the fetch unit. The time to fetch from the macro-operation cache 225 is smaller than the time to fetch from the storage 210 and so the use of the macro-operation cache 225 can improve efficiency.

In order to improve efficiency, macro-operations are selected for storing in the cache if they are determined to have a relatively high chance of being fetched again. In order to do this, a series of consecutive macro-operations are stored in the cache in response to a storage condition being met. The caching then ceases when a number of consecutively cached macro-operations reaches a storage threshold. The macro-operation cache 225 thus behaves similarly to the instruction storage circuitry of FIG. 1.

Examples of how the aforementioned storage/caching can be performed will now be described.

Figure 3A:
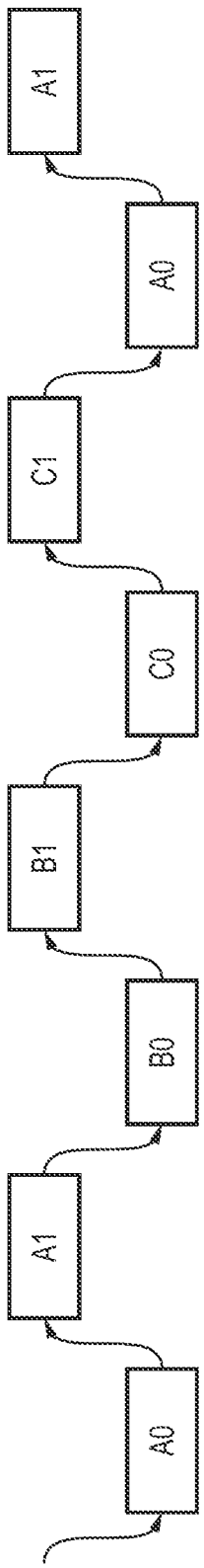
FIGS. 3A-3C depict a series of instructions, and methods of caching such instructions.

FIG. 3A schematically depicts a series of instructions A0, A1, B0, B1, C0, C1, A0, A1 which are to be fetched and for execution. Instructions A0, A1 are repeated (they have temporal locality), and the remaining instructions (B0, B1, C0 and C1) have poor locality (as they are executed only once, or are only repeated after significant time has passed).

Figure 3B:
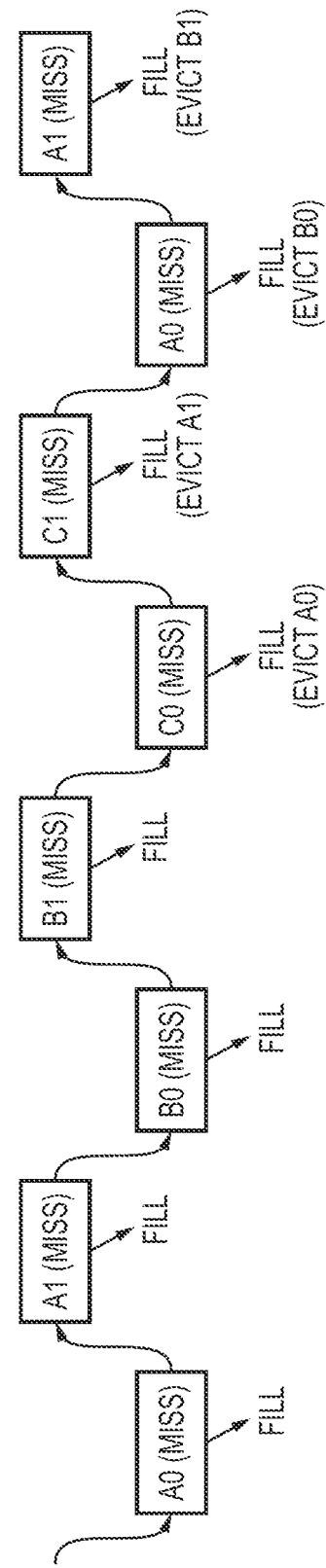

FIG. 3B schematically depicts a method of caching instructions (e.g. in a macro-operation cache such as the cache 225 of FIG. 2), according to a comparative example which does not implement examples of the present disclosure. In this comparative example, the cache has a capacity of 4 instructions, and an instruction which misses (i.e. is not already in the cache) is simply cached as it is received. The cache has a first-in-first-first-out policy, in which the oldest instruction in the cache is evicted to make way for a newly-filled instruction.

At the beginning of the figure, none of the instructions are cached. Instructions A0, A1, B0 and B1 thus miss in the cache, and are filled into the cache. The cache is then at capacity, with its content being (A0, A1, B0, B1).

Instruction C0 then misses in the cache, and is thus filled. The oldest entry (A0) is evicted from the cache to make space for C0. Similarly, instruction C1 misses and is filled, with A1 being evicted. At this point, the cache content is (B0, B1, C0, C1).

Instruction A0 is then to be executed again. However, as it has been evicted from the cache, it misses, is filled into the cache, and B0 is evicted. Similarly, A1 misses, is filled into the cache, and B1 is evicted.

Thus, despite the provision of the cache and the processing and power resources spent filling and evicting instructions, the re-use distance of instructions A0 and A1 is larger than the cache capacity and so their second access still misses in the cache. The cache thus provides no advantage.

Figure 3C:
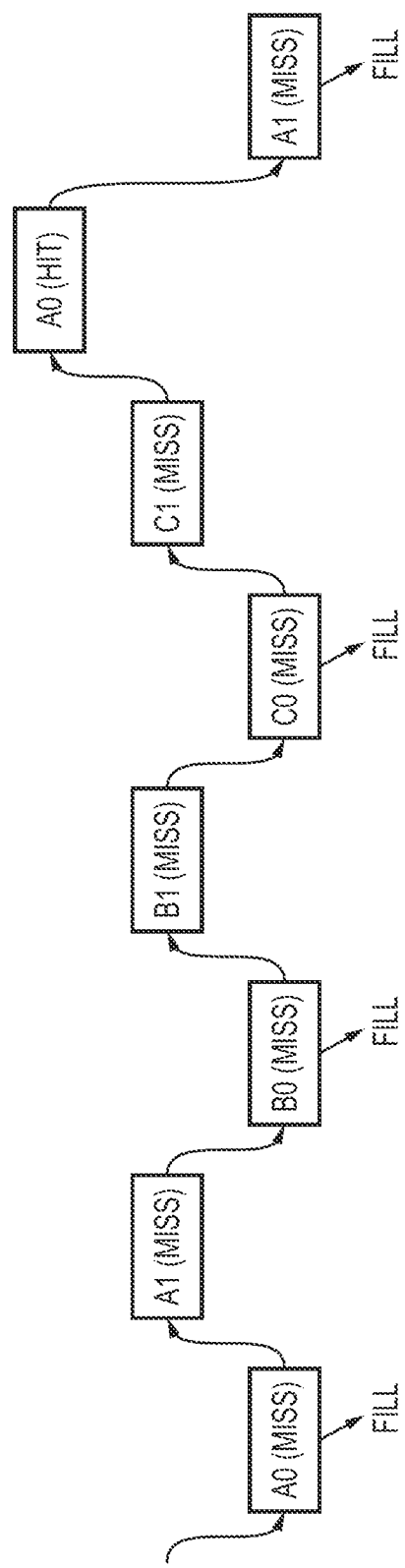

FIG. 3C depicts a method of operating the cache, according to an example of the present disclosure, which does not have this problem. In this example, the cache implements a filling policy in which only one consecutive fill is allowed (i.e. if the previous instruction was filled into the cache, the present instruction cannot be filled).

As before, at the beginning of the figure, none of the instructions are cached. A0 thus misses in the cache, and is filled. A1, despite missing in the cache, is not filled. Similarly, B0 misses in the cache and is filled, and B1 misses but is not filled, C0 misses and is filled, and C1 misses but is not filled. At this point, the cache content is (A0, B0, C0).

Instruction A0 is then accessed again. It hits in the cache, and can thus be efficiently fetched from the cache. Instruction A1 then misses in the cache, and is filled. At this point, the cache content is (A0, B0, C0, A1). If instructions A0 and A1 are subsequently accessed again (which is more likely for instructions exhibiting temporal locality, such as these), they can then both be fetched efficiently from the cache.

Thus, the present method effectively throttles the cache fill speed in such a way that, over time, useful instructions with high caching usefulness (i.e. with relatively strong temporal locality) are cached with preference over instructions with poor temporal locality. Indeed, if the instructions series A, B and C were extended to each include more instructions, the cache would naturally, over time, fill with instructions from series A and not series B or C. This improves the likelihood that a given instruction can be fetched from the cache, thereby improving overall efficiency without implementing any detailed instruction tracking mechanism. In effect, the cache effectiveness is significantly improved without a substantial increase in processing overhead. This is particularly effective in systems in which the cache is relatively small, compared with a typical instruction re-use distance.

Figure 4:
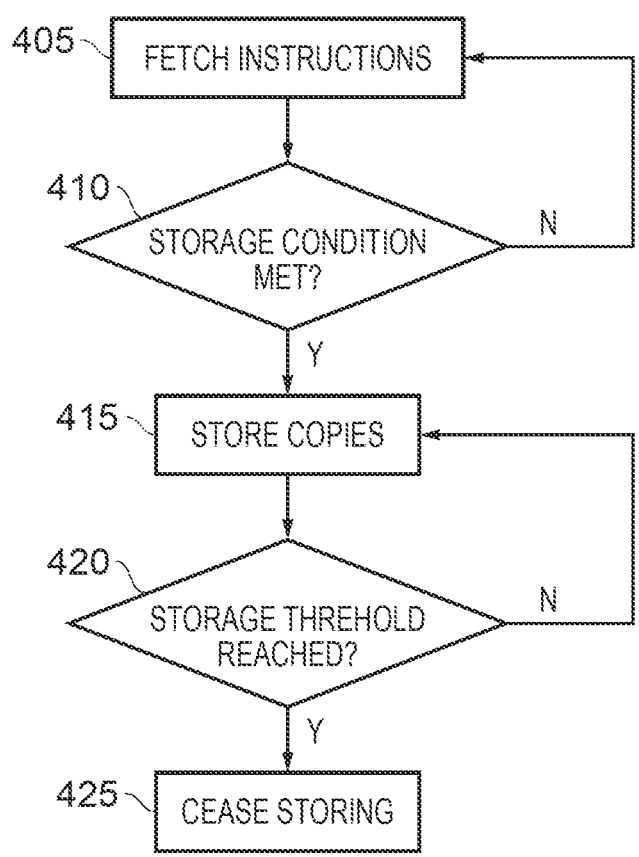
FIG. 4 depicts a method according to an example.

In the example of FIG. 3C, only single consecutive fills are permitted. However, more generally, a number of fills equal to a threshold may be permitted. FIG. 4 shows an example of such a method, which may be implemented in the apparatus of FIG. 1 or FIG. 2.

At block 410, an instruction is fetched.

At block 410, it is determined whether a storage condition is met. For example, the storage condition may be an instruction misses in a storage 110 or cache 225. If the condition is not met, flow returns to block 405. Otherwise, flow proceeds to block 415.

At block 415, a copy of that instruction is stored/cached.

At block 420, it is determined whether a storage threshold has been reached. If not, flow returns to block 415 and the next instruction is stored/cached. If the threshold has been met, flow proceeds to block 425 where the storing/caching is ceased.

Thus, following a storage condition being met, a number of instructions equal to the threshold is cached (i.e. FIG. 3C had a storage threshold of 1). The value of the threshold may be selected based on the properties of the system in which the method is implemented, for example the capacity of the storage/cache, expected reuse distances and locality of instructions, etc.

In some examples, multiple storage conditions may be used, with each having a different threshold. For example, one storage condition (in a system in which instructions are speculatively fetched before they are actually required) may be that the previous fetched instruction was the result of a branch misprediction. After such a misprediction is detected, the fetching is corrected, and thus the subsequent instruction can be assumed to be correct (and not an incorrect prediction). The assumed usefulness of subsequent instructions is thus higher than following an arbitrary instruction, and thus the threshold may be higher for fills following a branch misprediction.

Figure 5:
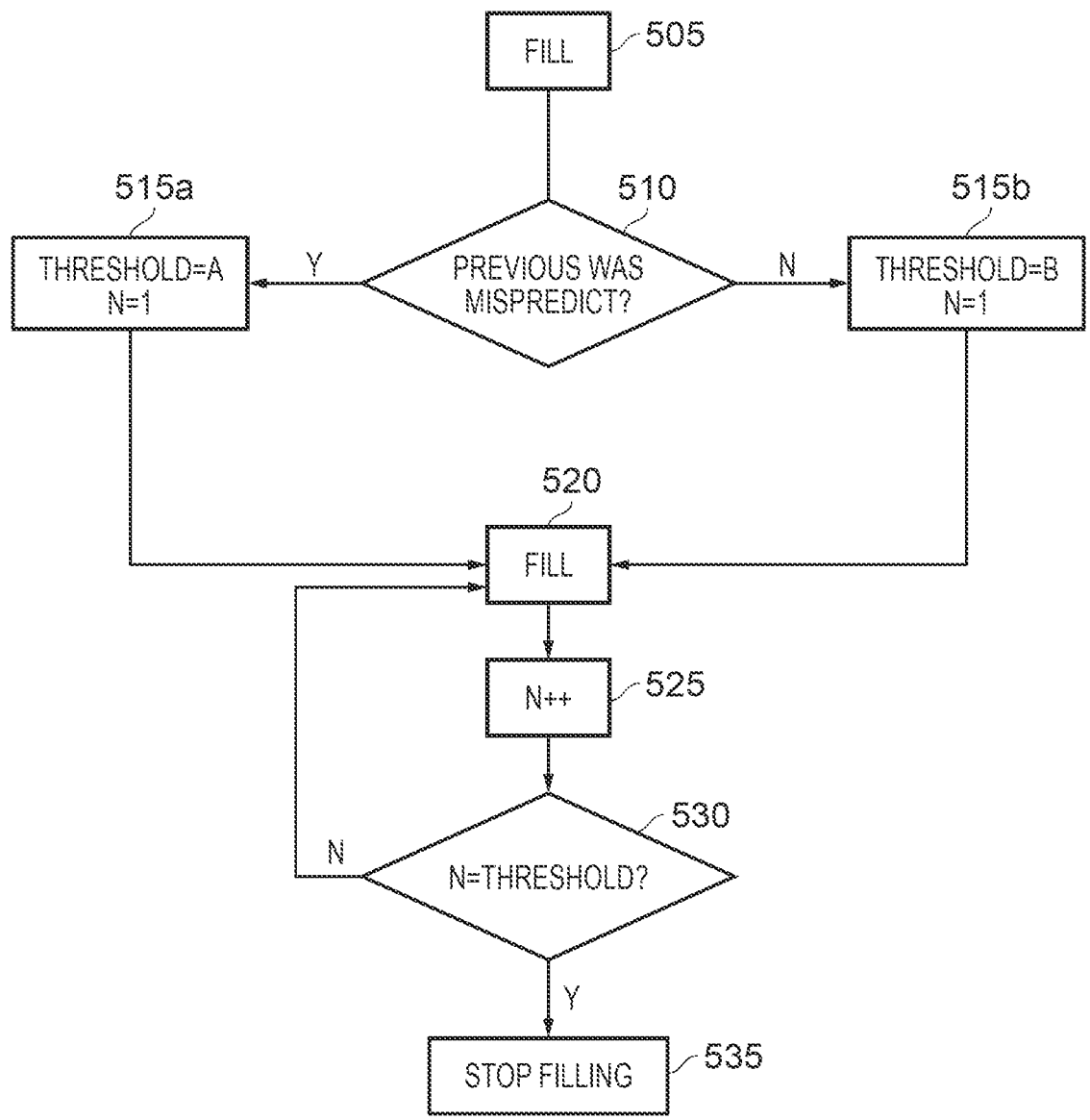
FIG. 5 depicts a method according to an example.

FIG. 5 depicts a method implementing such thresholds. The method may be implemented in the apparatus of FIG. 1 or FIG. 2. For ease of reading, the term "cache" is used, but it is to be understood that the method could equally applied to other types of storage.

At block 505, an instruction is filled into the cache (for example because it missed in the cache).

At block 510, it is determined whether a previous instruction was a misprediction. If so, flow proceeds to block 515a, where a storage threshold is set to value A and counter N is set to 1 (to take into account the instruction that was filled at block 505). Otherwise, flow proceeds to block 515b, where the storage threshold is set to value B and counter N is set to 1. Because of the aforementioned greater assumed usefulness of instructions following a detected misprediction, A may be higher than B. For example, A may be 3 and B may be 2.

Flow proceeds to block 520, where a subsequent instruction is filled into the cache.

Then, at block 525, counter N is incremented, and flow proceeds to block 530 where it is determined whether N is equal to the threshold. If not, flow returns to block 520. If N has reached the threshold, flow proceeds to 535 where filling ceases such that at least one further fill of the cache is blocked.

Thus, after A consecutive fills following a misprediction, at least one further fill is prevented. Otherwise, after B consecutive fills, at least one further fill is prevented.

This method effectively fills the cache with instructions that are likely to be more useful, by exploiting spatial locality (i.e. where neighbouring instructions will be accessed in the future) to measure the temporal locality of a given instruction. Instructions with high assumed temporal locality are preferentially cached, thereby improving the effectiveness of the cache and thus improving overall system efficiency and performance.

Figure 6:
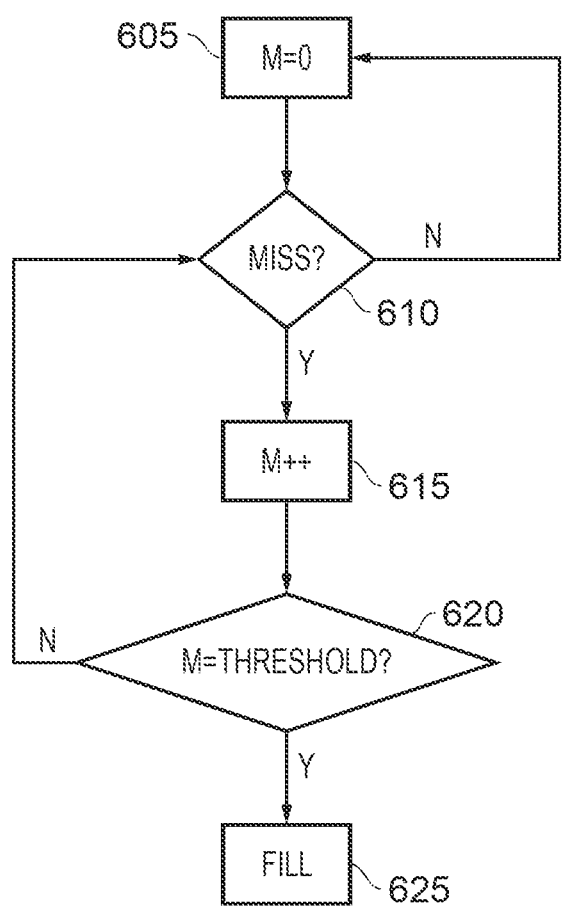
FIG. 6 depicts a method according to an example.

FIG. 6 schematically shows a method for refreshing a cache or storage that implements examples of the present disclosure, for example if (albeit unlikely) it has become full with useless or less-useful instructions (i.e. instructions that are not likely to be re-used soon).

At block 605, a counter M is set to zero.

At block 610, it is determined whether a given fetched instruction misses. If not (i.e. if the instruction hits), flow returns to block 605 where the counter M is reset to zero.

If the instruction misses, the counter M is incremented at block 615.

It is then determined, at block 620, whether M has reached a miss threshold. The threshold may for example be 1000 instructions, in an example in which the storage is a macro-operation cache with a capacity of 1500 instructions.

If M has not yet reached the threshold, flow returns to block 610 where it is determined if a subsequent instruction missed.

If M has reached the threshold, flow proceeds to block 625 where one or more subsequent miss instructions are filled. For example, instructions may be filled until the entire cache has been replaced with newly-filled instructions, or the filling may proceed until an instruction hits in the cache (indicating that such an instruction is useful and should remain in the cache).

In this manner, the cache or storage (or a portion thereof) can be refreshed if it has become populated with useless or less-useful instructions.

Apparatuses and methods are thus provided for improving the usefulness of temporarily stored copies of instructions.

From the above description it will be seen that the techniques described herein provides a number of significant benefits. In particular, the overall number of hits in the storage is improved, thereby improving instruction fetch performance and thus overall system performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
fetch circuitry to fetch instructions for execution by execution circuitry; and
instruction storage circuitry to store temporary copies of fetched instructions, wherein the fetch circuitry is configured to preferentially fetch instructions from the instruction storage circuitry, wherein the instruction storage circuitry is configured to:
responsive to a storage condition being met, begin storing copies of consecutive fetched instructions, the storage condition indicating a utility of a current fetched instruction;
responsive to determining that a number of said stored consecutive instructions has reached a storage threshold, cease storing copies of subsequent fetched instructions;
responsive to a number of consecutive fetched instructions not being fetched from the instruction storage circuitry exceeding a miss threshold, store a copy of the current fetched instruction in the instruction storage circuitry;
responsive to the number of consecutive instructions not being fetched from the instruction storage circuitry reaching the miss threshold, continue storing copies of current fetched instructions until a number of consecutive stored fetched instructions reaches a refill threshold; and responsive to the number of consecutive stored fetched instructions reaching the refill threshold, cease storing copies of current fetched instructions.

2. The apparatus according to claim 1, comprising decode circuitry to decode instructions fetched by the fetch circuitry, wherein:

the temporary copies of fetched instructions, stored by the fetch circuitry, are temporary copies of decoded fetched instructions.

3. The apparatus according to claim 2, wherein the instruction storage circuitry is a macro-operation storage circuitry.

4. The apparatus according to claim 1, wherein the storage condition is one of a plurality of potential storage conditions.

5. The apparatus according to claim 4, wherein:

each storage condition of the plurality has an associated storage threshold; and the instruction storage circuitry is configured to apply the storage threshold associated with the met storage condition.

6. The apparatus according to claim 5, wherein:

a first storage condition of the plurality is that a preceding fetched instruction was associated with a mispredicted program branch;

the first storage condition is associated with a first storage threshold.

7. The apparatus according to claim 5, wherein:

a second storage condition of the plurality is that a preceding fetched instruction was fetched from the instruction storage circuitry, and that a copy of the current fetched instruction is not stored in the instruction storage circuitry; and the second storage condition is associated with a second storage threshold.

8. The apparatus according to claim 6, wherein:

a second storage condition of the plurality is that a preceding fetched instruction was fetched from the instruction storage circuitry, and that a copy of the current fetched instruction is not stored in the instruction storage circuitry;

the second storage condition is associated with a second storage threshold; and the first storage threshold is greater than the second storage threshold.

9. The apparatus according to claim 8, wherein the first storage threshold is three instructions and the second storage threshold is two instructions.

10. The apparatus according to claim 1, wherein the miss threshold is larger than the storage threshold.

11. The apparatus according to claim 10, wherein the miss threshold is at least 100 times larger than the storage threshold, and optionally wherein the miss threshold is 1000 instructions.

12. The apparatus according to claim 1, wherein the refill threshold is at least 100 times larger than the storage threshold, and optionally wherein the refill threshold is 4000 instructions.

13. The apparatus according to claim 1, wherein the refill threshold is equal to a capacity of the instruction storage circuitry.

14. The apparatus according to claim 1, wherein said fetching is a speculative fetching of instructions which are predicted to be required for execution by the execution circuitry.

15. The apparatus according to claim 1, wherein the storage condition is indicative of an expected temporal locality of the current instruction.

16. The apparatus according to claim 15, wherein the storage condition is indicative of a spatial locality of the current instruction.

17. A method comprising:

fetching instructions for execution by execution circuitry;

responsive to a storage condition being met, beginning storing copies of consecutive fetched instructions, wherein:

the storage condition indicates a utility of a current fetched instruction; and said fetching comprises preferentially fetching instructions from the instruction storage, responsive to determining that a number of said stored consecutive instructions has reached a storage threshold, ceasing storing copies of subsequent fetched instructions;

responsive to a number of consecutive fetched instructions not being fetched from the instruction storage circuitry exceeding a miss threshold, storing a copy of the current fetched instruction in the instruction storage circuitry;

responsive to the number of consecutive instructions not being fetched from the instruction storage circuitry reaching the miss threshold, continuing storing copies of current fetched instructions until a number of consecutive stored fetched instructions reaches a refill threshold; and responsive to the number of consecutive stored fetched instructions reaching the refill threshold, ceasing storing copies of current fetched instructions.

18. Apparatus comprising:

fetch means to fetch instructions for execution by execution circuitry; and instruction storage means to store temporary copies of fetched instructions, wherein the fetch means is configured to preferentially fetch instructions from the instruction storage means, wherein the instruction storage means is configured to:

responsive to a storage condition being met, begin storing copies of consecutive fetched instructions, the storage condition indicating a utility of a current fetched instruction;

responsive to determining that a number of said stored consecutive instructions has reached a storage threshold, cease storing copies of subsequent fetched instructions;

responsive to a number of consecutive fetched instructions not being fetched from the instruction storage means-exceeding a miss threshold, store a copy of the current fetched instruction in the instruction storage means;

responsive to the number of consecutive instructions not being fetched from the instruction storage means reaching the miss threshold, continue storing copies of current fetched instructions until a number of consecutive stored fetched instructions reaches a refill threshold; and responsive to the number of consecutive stored fetched instructions reaching the refill threshold, cease storing copies of current fetched instructions.

* * * * *